United States Patent [19]

Kostas et al.

[11] 4,360,886

[45] Nov. 23, 1982

[54] METHOD AND APPARATUS FOR ANALYZING THE FEASIBILITY OF PERFORMING A PROGRAMMED SEQUENCE OF MOTIONS WITH A ROBOT

[75] Inventors: Evans Kostas, Bay Village; Gerald W. Crum, Elyria; Jerome F. Walker, Shaker Heights, all of Ohio

[73] Assignee: Nordson Corporation, Amherst, Ohio

[21] Appl. No.: 201,221

[22] Filed: Oct. 27, 1980

Related U.S. Application Data

[63] Continuation-in-part of Ser. No. 137,234, Apr. 4, 1980, Pat. No. 4,305,028.

[51] Int. Cl.³ .......................... G05B 19/42; B25J 9/00; G06F 11/30
[52] U.S. Cl. .................................... 364/551; 318/568; 364/513; 414/1
[58] Field of Search ............... 364/578, 513, 174, 190, 364/193; 318/565, 568

[56] References Cited

U.S. PATENT DOCUMENTS

| | | | |
|---|---|---|---|
| 4,300,198 | 11/1981 | Davini | 364/513 |
| 4,305,028 | 12/1981 | Kostas et al. | 318/565 |
| 4,338,672 | 7/1982 | Perzley et al. | 364/513 |

*Primary Examiner*—Felix D. Gruber
*Attorney, Agent, or Firm*—Wood, Herron & Evans

[57] ABSTRACT

An apparatus and method for determining the feasibility of performing a programmed sequence of motions with a robot. Included is a work robot at a first location having a plurality of power-driven, signal-controlled, relatively massive links interconnected to permit relative motion in plural degrees of freedom, the work robot having a given mechanical response characteristic. Associated with each link of the work robot is a position transducer which generates a signal representative of the actual position of its associated work robot link. Also included is a portable, relatively lightweight, manually manipulable simulator robot located remote from the work robot. The simulator robot has a plurality of different interconnected links adapted for manual movement in different degrees of freedom for setting a program of desired mechanical responses, with the links and degrees of freedom of the simulator robot simulating those of the work robot. Associated with each link of the simulator robot is a position transducer for generating a signal representative of the position of its associated simulator robot link. A signal recorder is provided at the location of the simulator robot for storing the position signals representative of the program of desired mechanical responses imparted to it by the operator. A work robot controller is provided at the site of the work robot which is responsive to the stored position signals for manipulating the work robot links to perform the movements corresponding to the program of desired mechanical responses limited only by the given mechanical response characteristic of the work robot. An analyzer responsive to the actual and desired position signals of the work robot links is provided for generating error signals correlated to the extent to which the work robot is capable of performing the program of desired mechanical responses manually imparted to the simulator robot. An indicator responsive to the analyzer provides a humanly perceptible indication of the feasibility.

14 Claims, 9 Drawing Figures

WORK ROBOT DRIVE
PHASE THREE

Fig. 4c

ROBOT CONTROLLER
PROGRAM EXECUTION
PHASE FOUR

Fig. 4d

METHOD AND APPARATUS FOR ANALYZING THE FEASIBILITY OF PERFORMING A PROGRAMMED SEQUENCE OF MOTIONS WITH A ROBOT

This is a continuation-in-part of Ser. No. 137,234 filed Apr. 4, 1980 now U.S. Pat. No. 4,305,028, entitled "System for Evaluating the Capability of a Work-Performing Robot to Reproduce a Programmed Series of Motions".

This invention relates to work-performing robots, and more particularly to an apparatus and method for determining the feasibility of performing a programmed sequence of motions with a work-performing robot having a limited mechanical response characteristic.

A work-performing robot typically includes a plurality of links, at least some of which are relatively massive, interconnected to provide relative motion in a plurality of degrees of freedom. The links are each provided with a signal-controlled actuator for powering the respective links, as well as a position transducer for providing a real-time signal correlated to the actual position of the respective robot links. Each work-performing robot has a particular mechanical response characteristic which has certain inherent limitations. As a consequence, a work-performing robot may be incapable of performing a desired sequence of programmed motions.

For example, it is possible that the programmed motion sequence requires the work robot links to move with velocities which the link actuators are incapable of producing by reason of certain inherent limitations in their size and/or capacity. Independent of whether the programmed motions will overload the link actuators, the work robot may be incapable of performing the desired sequence because its power source is overloaded. More specifically, the power source for the actuators, such as an hydraulic pump if actuators of the electrohydraulic type are used, may have its power limit, or capacity, exceeded, that is, the pump may be incapable of providing pressurized fluid simultaneously to all the actuators at rates sufficient to simultaneously drive their respective links at the desired programmed velocities. Independent of limitations of the system pump and/or link actuators, the work-performing robot may be unable to execute a series of programmed motions due to limitations inherent in the electronic controller which processes the programmed sequence of link command signals which ultimately control the link actuators.

It is often desirable to know in advance whether or not a particular programmed sequence of motions can be performed by a given work robot having specified controller, actuator, and/or pump limitations. For example, if a prospective robot user is contemplating use of a work-performing robot for a specific task, such as spray coating a specific article, the prospective user may wish to determine at the outset, that is, before actual purchase and installation of the work-performing robot, whether the specific robot under consideration can perform the task which the prospective user contemplates. Without such advance information, it is entirely possible that the prospective robot user could purchase and install a work robot to perform a specific task which the robot, by reason of inherent physical limitations in its actuators, controller, and/or power supply, is incapable of performing.

A partial solution to this problem is available in situations where the specific article which the prospective robot user wishes to spray coat is sufficiently small in size and weight to be transported to the site of the robot manufacturer. In such cases an effort can be made at the site of the robot manufacturer to spray coat the article using an actual work-performing robot of the general type the prospective robot user is contemplating using. If the work-performing robot is unable to satisfactorily spray coat the specific article under consideration due to its inherent limitations, the prospective robot user is advised and installation at the prospective user's facility of a robot incapable of doing the desired task is avoided.

Of course, if the article which the prospective work robot user proposes to spray coat is too massive and bulky to be transported to the site of the work robot, the capability of the work robot for spray coating the article in question cannot be evaluated in the foregoing manner. Similarly, and even if the proposed article itself is sufficiently small and lightweight to facilitate convenient transport to the site of the work robot, it may be impossible to evaluate the capability of the work robot for spray coating the article in question for a further reason. Specifically, it may not be possible to produce at the site of the work robot the environment of the article which is to be spray coated. For example, the article to be spray coated may be moving along a unique and unusual path on an automated conveyor, which conveyor cannot be conveniently and/or economically duplicated at the site of the work robot. As a consequence, even though the article itself can be transported to the work robot, its environment cannot, and hence it is impossible to evaluate the feasibility of spray coating the article in question by bringing it to the work robot site.

Accordingly, when either the article itself cannot be transported to the site of the work robot and/or the specific environment of the article cannot be simulated at the work robot site, it has heretofore been difficult to accurately and reliably predict whether the robot can satisfactorily be used to spray coat the article. It has been, therefore, an objective of this invention to provide a method and apparatus for determining the feasibility of performing a programmed sequence of motions with a work robot having an inherently limited mechanical response characteristic, which apparatus and method can be utilized in situations where it is not possible to duplicate the workpiece and/or the environment of the workpiece at the site of the work robot, and it is, therefore, not possible to actually attempt to perform the desired sequence of motions with respect to the desired workpiece in its real environment with an actual work robot.

The foregoing objective has been accomplished in accordance with certain principles of this invention by providing a portable, relatively lightweight, manually manipulable simulator robot at the site of the workpiece whereat there exists no work robot. The simulator robot has plural links and degrees of freedom simulating those of the work robot and a position transducer associated with each simulator robot link for generating position signals representative of the position of the associated simulator robot link. The simulator robot is manually manipulated at the site of the workpiece for setting a program of desired mechanical responses which it is ultimately desired to have the work robot perform on the workpiece. The position signals output from the simulator robot link transducers are recorded on a signal recorder, preferably of the wideband type.

The work robot, which is located remote from the site of the workpiece whereat the simulator robot is located, is driven with the recorded position signals generated when the simulator robot was manually manipulated through the desired programmed sequence of motions at the workpiece site, for performing work robot link movements corresponding to the program of desired mechanical responses limited only by the mechanical response characteristic of the work robot. While the work robot is being driven at its situs by the recorded signals generated at the time the simulator robot was manipulated through the desired programmed sequence of motions at the workpiece site, actual position signals are provided by transducers associated with the work robot links which represent the actual position of the various work robot links. Utilizing an analyzer input with both the actual work robot link position signals and the desired work robot link position signals provided by the recorder, error signals correlated to the extent to which the work robot is capable of performing the program of desired mechanical responses manually imparted to the simulator robot are derived. The error signals are input to a suitable indicating device which provides a humanly perceptible indication of the feasibility of the work robot for performing the program of desired mechanical responses imparted to the simulator robot at the workpiece site.

In a preferred embodiment of the invention the error derivation includes generating error signals correlated to the difference between the actual position of the work robot links and the desired position imparted to the simulator robot links at the workpiece site as recorded in the recorder. These positional error signals are then input to the indicating device which displays information correlated to the positional differences between the actual and desired work robot link positions.

In accordance with a further aspect of the invention, a switch element associated with the simulator robot is provided which is manually operable between OFF and ON conditions of the utilization device movable by the work robot. The ON/OFF switch may, for example, constitute the control switch on a spray coating gun. Means are also provided to monitor and record the condition of the switch when the simulator robot is manipulated through the different desired programmed sequence of motions at the workpiece site. The indicator device is responsive to the recorded switch condition signals for displaying the condition of the switch in association with the displayed information correlated to the positional difference between the actual and desired work robot positions. In this way the feasibility of the work robot for performing the program of desired mechanical responses is analyzed in dependence upon the condition of the switch. Differences between actual and desired work robot position which exist when the switch is OFF, for example, representative of when a spray coating gun is not actuated, may possibly be ignored, in which event the work robot is deemed capable of performing a programmed series of motions satisfactorily even though there are positional discrepancies between the desired and actual work robot link motions.

In accordance with a still further aspect of the invention, the analyzer generates error signals correlated to the difference between the actual velocity of the work robot links and the desired velocity imparted to the simulator robot links during manual programming of the desired sequence of motions. The indicator displays information correlated to the velocity differences between the actual and desired work robot link velocities in association with the displayed information representing the condition of the ON/OFF switch and the positional differences between the desired and actual work robot link positions. The coordinated display of positional and velocity errors along with the ON/OFF condition of the switch further enhances the determination of work robot utility for a given task.

For example, if no significant position or velocity errors exist, the work robot is clearly capable of performing the required task. If errors exist, for example, in a spray coating operation, but they occur when the spray coating gun is not actuated, the errors likely can be ignored since coating material is not being applied to the article at the time the error(s) are present. If errors exist when the spray coating gun is activated and coating material is being applied to the article, the nature of the spray coating task may be such that the errors can still be ignored. For example, experience has demonstrated that positional errors of $\frac{1}{2}$ inch or more can be tolerated when rust inhibitor is being applied to an automobile underbody. Of course, positional errors of this magnitude or even less are totally unsatisfactory if the spray coating task involves applying decorative pinstripes to the exterior of an automobile. Similarly, velocity errors which manifest themselves as variations in paint thickness, may or may not be tolerable depending on the nature of the article being coated. Errors of this type in spray coating a tractor engine can be ignored, while they cannot be when applying reflective coating to glass in the manufacture of a mirror. Thus, with this invention it is possible to evaluate the feasibility of executing a desired motion sequence, such as, spray coating a workpiece, with a work robot having an inherently limited mechanical response characteristic in situations where the workpiece and/or its environment cannot be duplicated at the site of the work robot and an actual attempt made to perform the desired spray coating or other operation on the workpiece itself.

These and other features, objectives, and advantages of the invention will become more readily apparent from a detailed description thereof taken in conjunction with the drawings in which.

Figure 1:
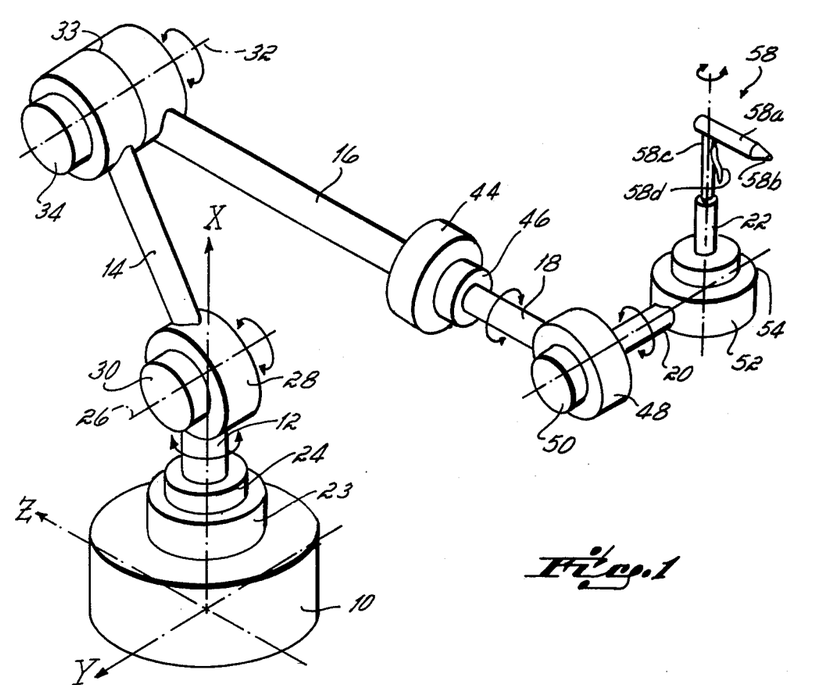
FIG. 1 is a perspective view, in schematic form, of a typical work-performing robot showing the general relationship of the relatively massive robot links and their respectively associated actuators and position transducers.

With reference to FIG. 1, a typical work-performing robot, with respect to which this invention is useful in assessing feasibility to perform a series of motions on a specific workpiece, is seen to include a base 10 which rests on the floor or other appropriate surface for supporting the robot. Extending from the base 10 are plural, series-connected, elongated, articulated members or links 12, 14, 16, 18, 20, and 22 which, in the preferred embodiment, provide the robot with several, in this instance six, degrees of freedom. In practice, the links 12, 14, 16, 18, 20, and 22 collectively constitute a relatively large mass. For example, the links 12, 14, and 16 are each approximately 1-4 feet in length, and typically weigh in the range of 10-400 pounds each. The links 18, 20, and 22 which, in the work-performing robot shown in FIG. 1 constitute a wrist, typically are significantly less massive than the links 12, 14, and 16, although this is not necessarily the case.

The link 12 is vertically disposed and mounted to the base 10 by a suitable joint which permits the link to rotate about its longitudinal axis which is coincident with the X axis. An actuator 23 is associated with the link 12, and is responsive to a position error signal provided by a conventional robot controller (not shown in FIG. 1) to facilitate selective, bidirectional, angular motion of the link 12 in an azimuthal direction about its longitudinal axis to the desired link position. Also associated with the link 12 is a position transducer 24 which provides an electrical signal correlated to the actual angular, or azimuthal, position of the link 12 relative to the base 10.

The link 14 at its lower end is connected to the upper end of the link 12 by a suitable joint for permitting pivotal, elevational movement of the link 14 in a vertical plane about a horizontal axis 26 which is perpendicular to the X axis and parallel to the Y-Z plane. Associated with the link 14 is an actuator 28 which is responsive to a position error signal from the robot controller and facilitates selective, bidirectional, elevational, pivotal movement of the link 14 about horizontal axis 26 to the desired link position. Also associated with the link 14 is a position transducer 30 which provides an electrical signal correlated to the actual elevational position of the link 14 relative to the link 12.

The link 16 at its inner end is connected to the upper end of the link 14 by a suitable joint for permitting the link 16 to move in a vertical plane about horizontal axis 32 which is parallel to axis 26. A suitable transducer 34 is associated with the link 16 for providing an electrical signal correlated to the actual angular elevational position of the link 16 with respect to the link 14. An actuator 33, associated with the link 16, is responsive to a position error signal from the robot controller and facilitates selective, bidirectional, elevational, pivotal movement of the link 14 about horizontal axis 32 to the desired link position.

The actuator 23 which bidirectionally drives the link 12 about the X axis provides the work-performing robot with one degree of freedom, namely, azimuthal positioning motion, while the actuators 28 and 33 which bidirectionally drive the link 14 and link 16, respectively, provide the robot with two degrees of freedom, each in an elevational direction.

The articulated links 18, 20, and 22 collectively constitute a wrist. Link 18 at its inner end is connected via a suitable joint to the outer end of the link 16. An actuator 44 is associated with the wrist member 18 for bidirectionally rotating, when input with suitable position error signals from the robot controller, the wrist member 18 to the desired link position about its longitudinal axis which is coincident with the longitudinal axis of the link 16. A suitable position transducer 46 is associated with the link 18 for providing an electrical signal correlated to the actual relative rotational position of the link 18 with respect to the link 16.

The link 20 is connected at its inner end via a suitable joint to the outer end of the link 18 for providing rotational movement of link 20 about its longitudinal axis which is perpendicular to the longitudinal axis of link 18. An actuator 48 is associated with link 20, and when input with suitable position error signals from the robot controller, bidirectionally rotates link 20 about its longitudinal axis perpendicular to the longitudinal axis of link 18 to the desired link position. A suitable position transducer 50 is also associated with link 20 for providing an electrical output correlated to the actual rotational position of this link relative to link 18.

Link 22 is connected via a suitable joint to the outer end of link 20 to facilitate rotation of link 22 about its longitudinal axis which is disposed perpendicularly to the longitudinal axis of link 20. An actuator 52 associated with link 22, when input with suitable position error signals from the robot controller, facilitates bidirectional motion of link 22 about its longitudinal axis to the desired link position. A transducer 54, also associated with link 22, provides an electrical signal output correlated to the actual relative rotational position of link 22 relative to link 20.

Link 22 constitutes the mechanical output element of the work-performing robot. While the mechanical output of the robot can be utilized for positioning a wide variety of devices, in the preferred form of the invention the work-performing robot is utilized to position a spray coating gun 58 having a barrel 58*a* with a nozzle 58*b* which emits coating particles. The gun handle 58*c* is mounted to the upper end of the wrist link 22. The gun handle 58*c* mounts a suitable trigger mechanism 58*d* which, when actuated by a suitable signal-operated device (not shown), functions to control the emission of coating particles from the nozzle 58*b* of the spray gun 58.

The longitudinal rotational axes of wrist links 18, 20, and 22 are mutually perpendicular, and accordingly constitute three degrees of freedom for the robot. These three degrees of freedom, coupled with the three degrees of freedom of the links 12, 14, and 16, provide a total of six degrees of freedom for the work-performing robot.

In the operation of the work-performing robot shown in FIG. 1, a series of programmed, i.e., desired, link position signals stored in a suitable memory device of the robot controller are periodically retrieved and compared against the actual link position signals provided by the link position transducers 24, 30, 34, 46, 50, and 54, and in response thereto the link positional error signals are generated for each of the links 12, 14, 16, 18, 20, and 22. The positional error signals for the various links 12, 14, 16, 18, 20, and 22 are then input to the various link actuators, 23, 28, 33, 44, 48, and 52, which typically are of the servo-controlled electrohydraulic type, for moving the links to the desired, or programmed, positions which in turn reduce the positional error signals to zero. Thus, the links of the work-performing robot of FIG. 1 are driven through the programmed sequence of desired motions, utilizing closed-loop servo techniques, by periodically comparing desired position signals retrieved from the memory of the robot controller with actual link position signals from their associated position transducers, and using the resulting positional error signals associated with the different links to drive the various link actuators to the desired, or programmed, positions.

Since the robot controller, actuators, position transducers, closed-loop servo controls, and the like of the work-performing robot of FIG. 1 are well known and form no part of this invention, they are not further discussed in detail herein, except to the extent necessary to an understanding of the flow charts of FIGS. 4a-4e.

Figure 2:
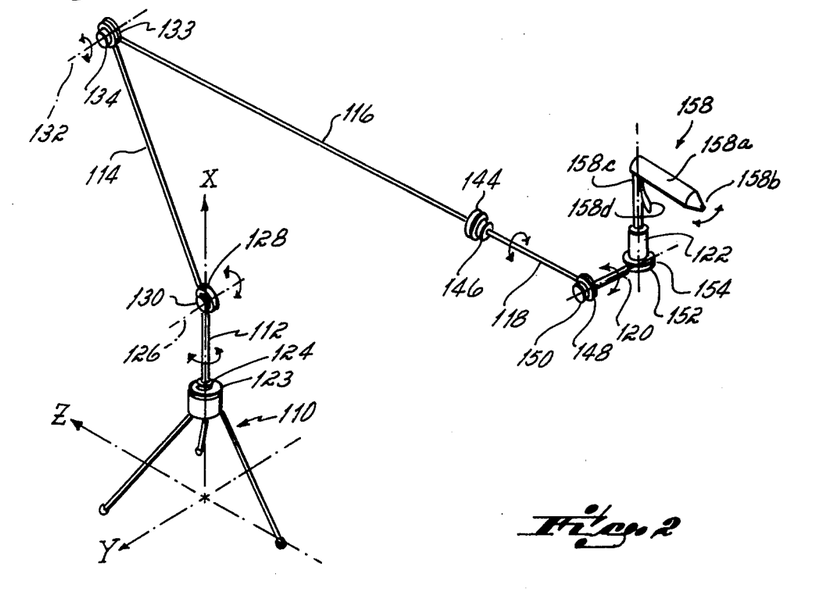
FIG. 2 is a perspective view, in schematic form, of a lightweight, hand manipulable simulator robot showing the general relationship of the simulator links and associated position transducers.

The robot simulator, shown in FIG. 2, which is useful in the work robot feasibility analysis system of this invention, includes a tripod base 110 from which extends vertically a link 112 which is connected to the base for rotational movement about a vertical axis by a rotary joint 123. A position transducer 124 associated with the link 112 and base 110 provides an electrical signal correlated to the actual angular position of the link 112 relative to the stationary base. Pivotally connected to the upper end of the link 112 by a rotary joint 128 is a link 114 which pivots about axis 126. An angular position transducer 130 associated with the joint 128 and the link 114 provides an electrical signal correlated to the actual angular position of the link 114 with respect to the link 112. A link 116 connects to the link 114 via a rotary joint 133 for pivotal movement about axis 132. An angular position transducer 134 associated with the joint 133 and the link 116 provides an electrical signal correlated to the actual angular position of the link 116 with respect to the link 114.

Also included in the robot simulator depicted in FIG. 2 are links 118, 120, and 122 which are pivotally connected to links 116, 118, and 120, respectively, via rotary joints 144, 148, and 152, respectively. Angular position transducers 146, 150, and 154 associated with the rotary joints 144, 148, and 152, respectively, and the links 118, 120, and 122, respectively, provide electrical signals correlated to the actual angular position of the links 118, 120, and 122 with respect to the links 116, 118, and 120, respectively.

Mounted to the link 122 is a spray gun 158 having a barrel 158a, a nozzle 158b, and a handle 158c which mounts an ON/OFF switch 158d.

The length of the links 112, 114, 116, 118, 120, and 122 of the simulator robot of FIG. 2 are identical to the lengths of the links 12, 14, 16, 18, 20, and 22, respectively, of the work-performing robot shown in FIG. 1. Of course, the mass of the links 112, 114, 116, 118, 120, and 122 of the simulator robot of FIG. 2 are a mere fraction of that of their counterpart links 12, 14, 16, 18, 20, and 22 of the considerably more massive work-performing robot shown in FIG. 1. Similarly, the joints 123, 128, 133, 144, 148, and 152 of the simulator robot permit the same type of pivotal motion between their respectively associated links 112, 114, 116, 118, 120, and 122 as their counterpart rotary actuators 23, 28, 33, 44, 48, and 52 provide for their respectively associated links 12, 14, 16, 18, 20, and 22 of the work-performing robot.

When the spray gun 158 is moved manually by an operator grasping the handle 158c thereof through a sequence of motions necessary to spray coat an object, which is possible due to its lightweight construction, the various links 112, 114, 116, 118, 120, and 122 of the simulator robot move through a sequence of motions. Simultaneously, the transducers 124, 130, 134, 146, 150, and 154 of the simulator robot associated with the various simulator robot links 112, 114, 116, 118, 120, and 122 provide electrical outputs corresponding to the actual sequence of positions, or motions, through which the simulator robot links move in the course of manually moving the gun through the positions necessary to coat the object. These transducer signals corresponding to the actual positions of the different simulator robot links can be recorded by any suitable means (not shown in FIG. 2) and thereafter the recorded signals input to the robot controller of the work-performing robot where they are compared with signals correlated to the actual work robot link positions and link position error signals derived for input to the work robot link actuators to cause the work robot links to reproduce the motion of the simulator robot links in the manner previously described.

In the course of moving the gun 158 associated with the simulator robot through the sequence of motions necessary to spray coat the desired object, the operator periodically manually actuates the trigger 158d to emit spray coating material from the gun nozzle 158b. By recording signals corresponding to the position of switch 158d in conjunction with recording the position signals provided by the actual position transducers 124, 130, 134, 146, 150, and 154 of the simulator robot for the entire sequence of motions of the simulator robot links 112, 114, 116, 118, 120, and 122 produced by manual manipulation by the operator of the gun 158, a sequence of coordinated gun switch command signals and desired robot link position signals can be stored. These stored signals can then be input to the robot controller and stored, and subsequently repetitively read out from storage within the robot controller and used for repeating the programmed sequence of motions with the work-performing robot of FIG. 1 to coat the object with gun 58, which sequence of motions was first performed manually by the operator with the simulator robot and gun 158.

The rotary actuators 23, 28, 33, 44, 48, and 52 of the work-performing robot shown in FIG. 1 are typically of the hydraulic type, each including an electrohydraulic servo-valve for controlling the rate and direction of flow of hydraulic fluid therethrough. Typically a single hydraulic pump (not shown) is provided for supplying pressurized hydraulic fluid to all the actuators of the work-performing robot. While the hydraulic power rating of the pump, in terms of gallons per minute at a predetermined pressure, can vary depending upon the size of the pump used, for a given work-performing robot the hydraulic power capacity of the robot is fixed since it has associated with it a single hydraulic pump of predetermined physical characteristics.

By reason of the hydraulic power limits which attend the use of an hydraulic pump of predetermined physical characteristics, a limitation exists on the aggregate or total rate of flow of hydraulic fluid from the hydraulic pump to the hydraulic actuators of the work-performing robot. Since the velocity of a link of the work-performing robot is correlated to the rate of flow of hydraulic fluid to the hydraulic actuator associated with the link, the aggregate or total of the velocities of all the links of the work-performing robot is limited by the maximum flow rate which can be provided by the hydraulic pump. In practice it is often attempted to program a work-performing robot in a manner which overloads, or places excessive demands upon, the hydraulic pump, with the result that the pump is unable to supply all the fluid required by all the actuators. When this occurs the various links of the work-performing robot are unable to fully execute or achieve the programmed sequence of positions. Stated differently, the situation rises in practice that the programmed sequence of motions are such that they collectively exceed the hydraulic power limits of the pump, in which case the work-performing robot is unable to fully execute the programmed motion sequence, giving rise to positional and/or velocity errors in work robot motion.

In addition to the foregoing limitations on the work-performing robot which exist by reason of the inability of the hydraulic pump to supply pressurized fluid beyond some given maximum flow rate, limitations are also imposed on the ability of the work-performing robot to execute a programmed sequence of motions by reason of the inherent capacity limitations of the rotary actuators which move the various links of the work-performing robot in the commanded manner. For hydraulic fluid supplied at a predetermined pressure, an hydraulic actuator, by reason of its physical design, has a maximum flow rate above which hydraulic fluid at the predetermined pressure cannot exceed. This maximum flow rate through the hydraulic actuator of fluid at a predetermined pressure imposes a corresponding limitation on the maximum angular velocity which can be achieved by the link which is being driven by the actuator.

In practice, it is possible that the desired position signal for one or more steps of a programmed sequence of motions will be such that the hydraulic actuator which is commanded thereby will, by reason of its inherent flow rate limitations, be unable to move the link at a velocity sufficient to position the link at the desired position within the allotted time for that program step. Thus, the link or links fail to execute the programmed step or steps because of limitations of the actuators which drive them. This is in contrast to the previously described inability of the work-performing robot to carry out the programmed sequence of motions by reason of limitations on the power supply capability of the hydraulic pump which supplies the rotary actuators associated with the various links, and constitutes a further source of work robot positional and/or velocity errors.

In addition to the foregoing, the work robot may also be incapable of executing a series of programmed motions by reason of inherent limitations in the robot controller. For example, the robot controller information processing rate may be unduly slow, with the result that the rate at which it can read desired link position signals stored therein and compute link position error signals is too slow to enable the work robot links to accurately track the sequence of link motions through which the operator manipulated the simulator robot when operating on the workpiece during the programming phase, thus constituting a still further source of positional and/or velocity errors.

To facilitate evaluation of the ability of a work robot to perform a sequence of desired motions notwithstanding inherent limitations imposed by the hydraulic pump and/or the individual link actuators and/or the robot controller, which give rise to positional and/or velocity errors in work robot motion, the method and apparatus of this invention depicted in FIGS. 3, 4a–4e, and 5 are utilized.

Included in the preferred embodiment is a simulator robot of the type described in connection with FIG. 2, which is located at the site of the workpiece. Also included is a work robot of the type described in connection with FIG. 1, which is located at a site remote from the location of the simulator robot and workpiece. As will be recalled, the workpiece, by reason if its mass and/or environment, cannot be brought to the site of the work robot to assess feasibility by actually operating on the workpiece with the work robot. With the system of this invention, feasibility can be evaluated notwithstanding inability to bring the workpiece to the work robot site.

Figure 3:
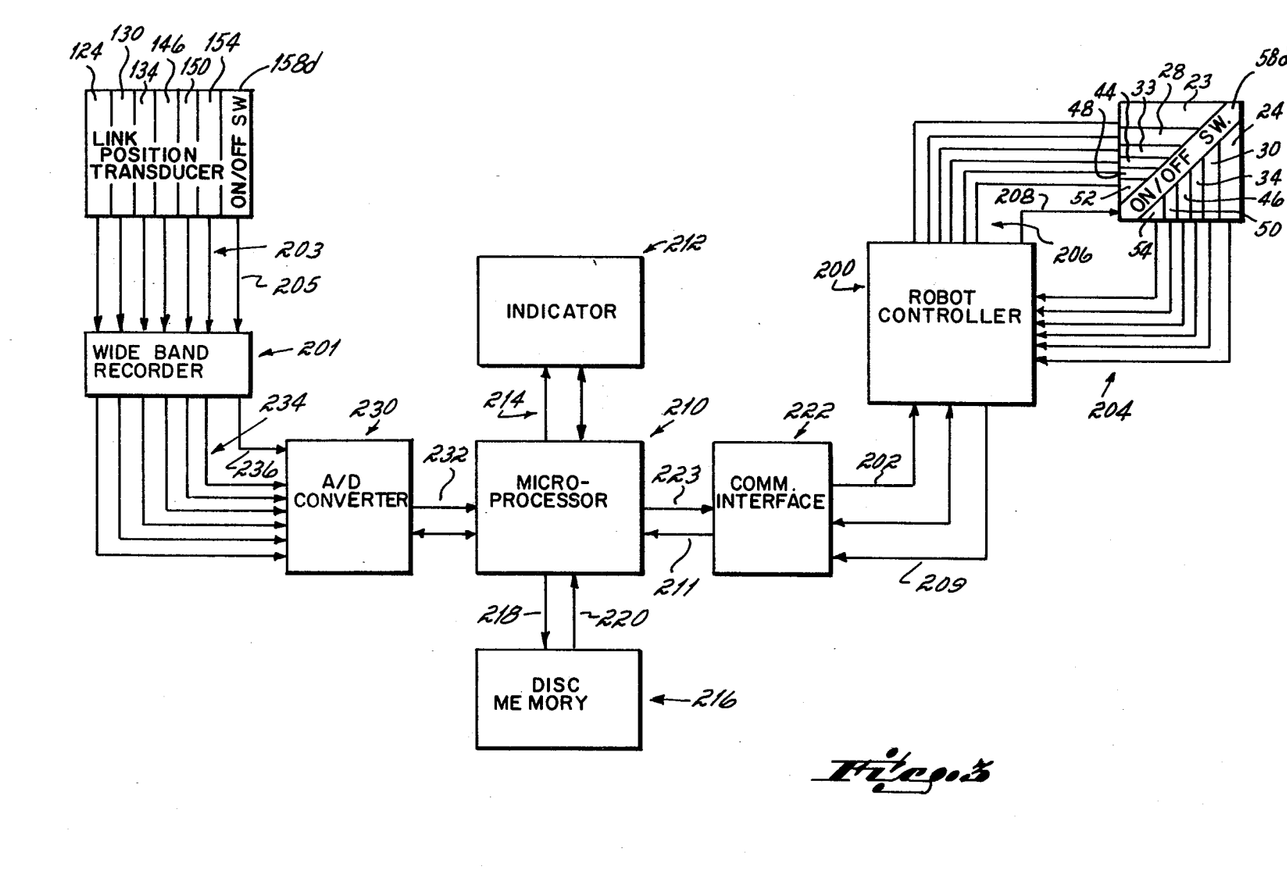
FIG. 3 is a circuit diagram in block format of a preferred embodiment of the invention.

In addition to the simulator robot and work robot, the system of this invention further includes a recorder 201. Recorder 201 stores the signals output from (a) the simulator robot link position transducers 124, 130, 134, 146, 150, and 154 correlated to the varying simulator robot link positions during the course of manual manipulation of the simulator robot through the desired sequence of motions by the operator at the site of the workpiece, and (b) the simulator robot ON/OFF switch monitor 158d. If the work robot executes N position commands per robot link per second and there are M links, and if the work robot further executes N ON/OFF switch commands per second, the recorder 201 must be capable of storing N(M+1) link position commands per second. In the preferred embodiment of the invention there are six work robot links, i.e., M=6, and the work robot executes 32 ON/OFF switch commands per second and 32 position commands per link per second, that is, N=32. Thus, the recorder 201 must be capable of storing 224, that is, N(M+1), commands per second.

The link position commands output from the simulator robot link position transducers 124, 130, 134, 146, 150, and 154, which correspond to desired positions of the work robot links 12, 14, 16, 18, 20, and 22, are input to the recorder 201 on lines 203. The ON/OFF switch output from simulator robot switch monitor 158d, which corresponds to the desired ON/OFF condition for work robot trigger 58d, is input to the recorder on line 205. If desired, the desired link position signals on line 203 and ON/OFF switch signals on line 205 to the recorder 201 may be multiplexed and recorded on a single channel recorder 201 in serial fashion. In such event the recorder 201 includes a multiplexer. Alternatively, the recorder 201 could be of the multi-channel type in which the desired link position and ON/OFF switch signals input on lines 203 and 205 could be recorded in parallel, in which event a multiplexer is unnecessary. One preferred form of multi-channel recorder 201 of the magnetic tape type, which is satisfactory for parallel-type recording, is designated Model R-81 commercially available from TEAC, which is distributed in the U.S.A. by B. J. Wolfe Enterprises, North Hollywood, California.

Associated with the work robot is a robot controller 200, which preferably is a specially programmed microprocessor. The robot controller 200 includes a random access memory (RAM) for storing a programmed sequence of desired positions of the various work robot links 12, 14, 16, 18, 20, and 22, as well as the sequence of actual positions of the work robot links which result when the work robot is input with, that is, driven by, the programmed sequence of desired positions stored in the robot controller RAM. Also included in the robot controller 200 are computing means for comparing desired work robot link positions and actual work robot link positions and deriving in response thereto work robot link position error signals for input to the link actuators 23, 28, 33, 44, 48, and 52 of the work robot. Signals correlated to the desired work robot link positions are input to the robot controller on line 202, while signals correlated to the actual work robot link positions are input to the robot controller on lines 204. The work robot link position error signals computed by the robot controller are output to the respective link actuators 23, 28, 33, 44, 48, and 52 of the work robot on lines 206.

The robot controller RAM also stores signals correlated to the desired condition of the ON/OFF switch 58d of the work robot. These ON/OFF switch condition signals are input to the robot controller on line 202, and are output to the ON/OFF switch 58d of the work robot on line 208.

Further included, and also located at the site of the work robot and its associated robot controller 200, is a microprocessor 210 and an indicator 212. The microprocessor 210 functions as an analyzer for comparing the desired work robot link position signals with the actual work robot link position signals, and provides, on line 214 to the indicator 212, signals correlated to discrepancies between the desired and actual work robot link positions. The microprocessor 210 also derives from the desired and actual work robot link position signals, signals correlated to the desired and actual work robot link velocities. These latter signals are compared in the microprocessor 210 to provide signals on line 214 to indicator 212 correlated to discrepancies between the desired and actual work robot link velocities. Also input to the indicator 212 on line 214 are signals correlated to the desired condition of the ON/OFF switch 58d of the work robot.

The microprocessor 210 also performs certain routine buffer storage and information flow control functions to become apparent hereafter.

In response to the position and velocity error signals to the indicator 212 on line 214, derived by comparing the desired and actual work robot link positions and velocities, the indicator 212 provides a suitable humanly perceptible indication of the extent to which the actual work robot link positions and velocities fail to match or track the desired work robot link positions and velocities established during manual manipulation of the simulator robot by the operator at the site of the workpiece. The position and velocity discrepancy indications provided by the indicator 212 are coordinated with each other such that it is possible to determine at any given point in a programmed sequence of motions the extent of the velocity of discrepancy and position discrepancy for each work robot link.

Preferably, the indicator 212 also provides a humanly perceptible indication of the desired condition of the work robot ON/OFF switch 58d, this latter indication being coordinated in time with the indications of the work robot velocity and position discrepancy indications. In this way, if work robot position and velocity discrepancies exist which can safely be ignored by reason of the fact that the work robot ON/OFF switch 58d is in an OFF condition, this information will be apparent to the person doing the evaluation from the coordinated indications of work robot link position and velocity discrepancies along with work robot ON/OFF switch condition indications. Often it may be possible to ignore significant discrepancies between desired and actual positions and/or velocities of the work robot links when the ON/OFF utilization device, such as a spray coating gun, carried by the output link of the work robot is in an OFF condition, that is when the workpiece is not being spray coated by the gun.

Significant discrepancies between desired and actual work robot link positions and/or velocities typically cannot be ignored if such occur when the ON/OFF switch associated with the spray gun or the like carried by the work robot output link is in an ON condition and the workpiece is being spray coated. However, depending upon the extent of the particular work robot link position and/or velocity discrepancy, the nature of the workpiece being spray coated, and the nature and purpose of the coating being applied, position and velocity discrepancies possibly may be safely ignored even when the ON/OFF switch is in the ON condition. For example, if the discrepancy occurs during coating of a portion of the workpiece which when the workpiece is in use will not be seen by reason of being hidden by a molding or the like, it is often possible to safely ignore the position and/or velocity discrepancy. An example of how the nature and purpose of the spray coating bears on the extent, if any, to which position and/or velocity discrepancies can be tolerated can be more readily understood by considering the effect of a one-half inch discrepancy in desired and actual position when a pinstripe is being applied to an automobile body and when the same automobile body is having its underbody spray coated with rust inhibitor. Obviously, a one-half inch discrepancy in the former case is totally unsatisfactory, while a one-half inch discrepancy in the latter situation is entirely acceptable. Similarly, a discrepancy in velocity, which typically manifests itself as a variation in thickness of the coating material, can be tolerated if the article being coated is a diesel engine for a tractor, yet even a small velocity discrepancy cannot be tolerated in the application of a reflective silver coating to a mirror.

The microprocessor 210, which as noted previously is specially programmed, is provided with a random access memory (RAM) for buffer storage of the desired robot link positions, actual robot link positions, desired conditions of the work robot ON/OFF switch, and discrepancies between desired and actual robot link positions and velocities. It also operates to control the flow of data between the various components to which it is connected.

Associated with the microprocessor 210 is a memory 216, preferably of the disc type. The disc memory 216 stores actual work robot link positions and desired work robot link positions, and desired ON/OFF work robot switch conditions, all of which are input to the disc memory via line 218. The actual and the desired work robot link positions stored in the disc memory 216 are input via line 220 to the microprocessor 210 to facilitate computation of position and velocity discrepancies between actual and desired work robot link position and velocities for subsequent input to the indicator 212 via line 214 for work robot feasibility evaluation purposes. The desired work robot link positions stored on disc memory 216 are also input to microprocessor 210 via line 220 when it is desired to drive the work robot via the controller to perform the desired motion sequence generated by the operator at the workpiece site with the simulator robot. The desired ON/OFF work robot switch conditions are input to the analyzer from disc memory 216 via line 220, when required for providing indications thereof by indicator 212, or driving the work robot via controller 200.

A suitable communications interface 222 is provided between the robot controller 200 and the microprocessor 210 to facilitate the exchange of information between the microprocessor 210 and the robot controller 200.

In addition to data lines between the various components, 200, 222, 216, 210, and 212, combined control signal and status signal lines are provided between each of these units. Such lines are indicated by double-ended arrows which reflect the bidirectional nature of the control and status information passing along the respective lines.

If the link position transducers 24, 30, 34, 46, 50, and 54 of the simulator robot provide signals in analog form, and the recorder 201 is of the type which records analog signals, an analog/digital converter 230 is provided. The analog/digital converter 230 has its output connected to the microprocessor 210 for providing to the microprocessor on line 232 digitized signals corresponding to the desired work robot link positions and ON/OFF switch conditions which are input to the analog/digital converter when the recorder 201, after recording a programmed sequence of motions and ON/OFF switch conditions output by the simulator robot at the workpiece site, is transported to the remote site of the work robot and connected to the input of the analog/digital converter via robot link position data lines 234 and ON/OFF switch condition line 236. The analog/digital converter 230 must include a time division multiplexer if the recorder 201 is of the multi-channel type for recording on separate channels the desired work robot position signals and the desired condition of the work robot ON/OFF switch. A control and status line interconnects the output of the analog/digital converter 230 and the microprocessor 210 to facilitate bidirectional transmission of control and status signals.

If the recorder 201 records the desired link position signals and the ON/OFF switch condition signals in serial (vis-a-vis parallel) format, the analog/digital converter 230 interconnected between the output of the recorder 201 and the input of the microprocessor 210 is unnecessary. Where an analog/digital converter 230 is required by reason of the analog nature of the record, a form of analog/digital converter satisfactory for use in this invention is commercially available from Digital Equipment Corporation, Maynard, Massachusetts, designated Model LSI-11/23.

Assuming it is desired to determine the feasibility of utilizing the work robot to perform a programmed sequence of motions with respect to a workpiece which, by reason of its mass and/or special environment, cannot be brought to the site of the work robot for evaluation purposes, feasibility is determined by locating the simulator robot at the site of the workpiece. An operator manipulates the simulator robot through the desired sequence of motions with respect to the workpiece. While the operator is manipulating the simulator robot, the outputs of the link position transducers 124, 130, 134, 146, 150 and 154 of the respective simulator robot links are input to the recorder 201 where they are recorded. Additionally, the condition of the robot simulator ON/OFF switch 158d input to the recorder 201 on line 205 is also recorded. This data collection step 300 is shown in the flow chart depicted in FIG. 4a.

Figures 4A, 4B:
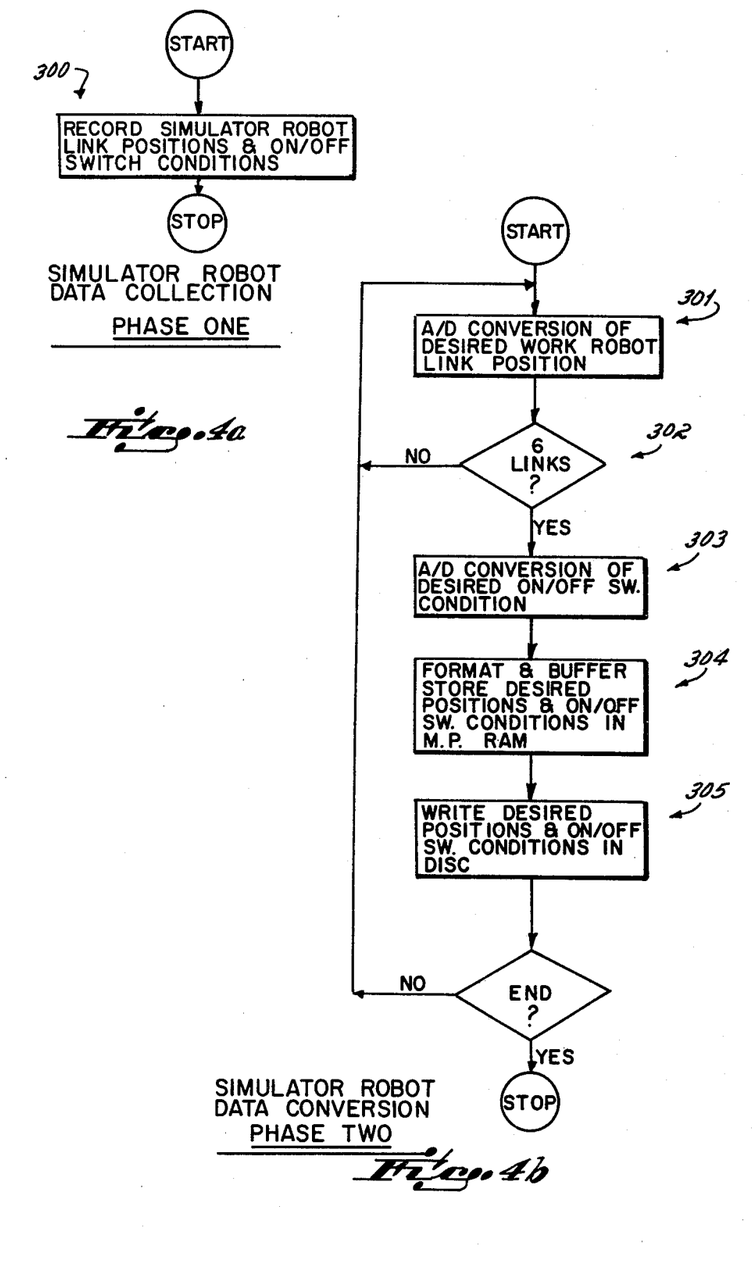
FIGS. 4a to 4e show flow charts of the preferred embodiment of the invention.

Upon conclusion of the data collection step, the recorder 201 is transported from the site of the workpiece, whereat the simulator robot was used to provide the recording of the programmed sequence of desired motions and ON/OFF switch conditions, to the remote site whereat the work robot is located. At the work robot site the output of the recorder 201 is connected to the analog/digital converter 230. Referring to the flow chart of FIG. 4b, and assuming the recorder 201 is of the multi-channel type and the recording analog in form, the desired link position signals on lines 234 and the ON/OFF switch condition signals on line 236 are converted from analog to digital form in the analog/digital converter 230. The analog/digital converter 230 converts the inputs thereto which are in analog form to digital form on a time division multiplex basis. Upon the conclusion of the conversion from analog to digital of a single set of desired link position signals (steps 301 and 302), with a "set" consisting of one desired link position signal per link, the analog to digital converter converts the ON/OFF switch condition signal, which is also in analog form, to digital form in step 303. The digitized set of desired link position signals and the ON/OFF switch condition signal are input to the microprocessor 210 via line 232 where they are buffer stored in the microprocessor RAM and, if necessary, reformatted in step 304 to be compatible with the robot controller 200. A "set" of link position signals and an ON/OFF switch condition signal are collectively referred to thereafter as a "group". The digitized, and if necessary reformatted group of desired link position and ON/OFF switch condition signals are then transferred from the RAM of microprocessor 210 to the disc memory 216 via line 218 in step 305. Once this has been done for a single group of desired link position and ON/OFF switch condition signals, the process is repeated for the next group of desired link position and ON/OFF switch condition signals output from the recorder 201. When all groups of desired link position and ON/OFF switch condition signals output from the recorder 201 have been converted from analog to digital by the analog/digital converter 230, reformatted if necessary, and transferred from the microprocessor RAM to the disc memory 216, the data conversion and storage phase shown in the flow chart depicted in FIG. 4b is complete.

Figure 4C:
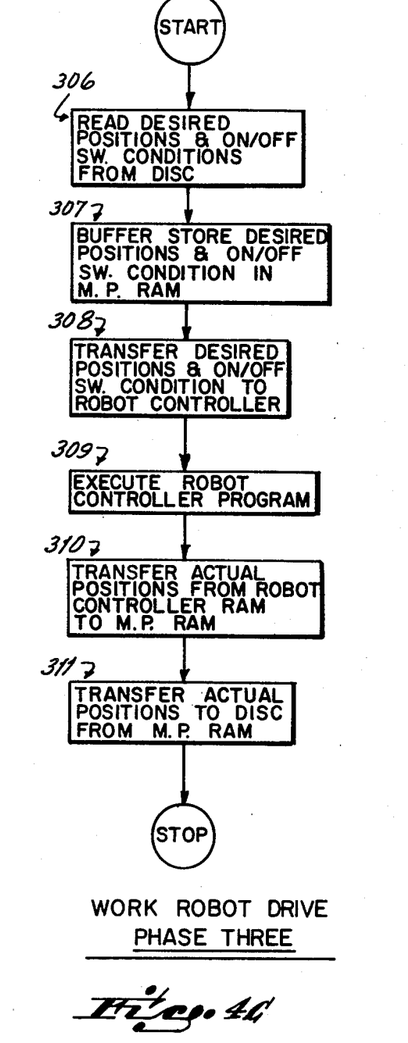
Figure 4D:
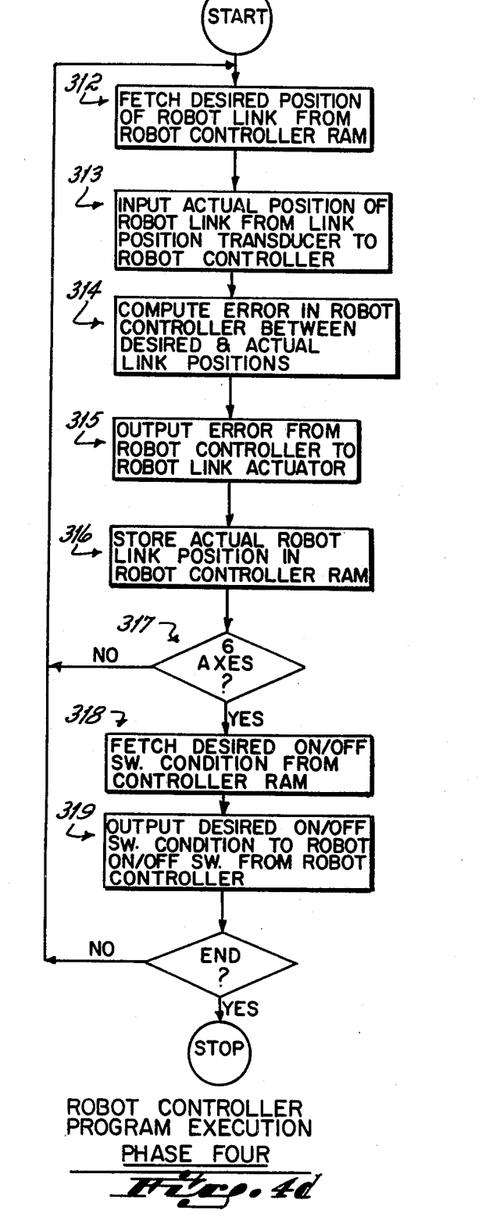

Following reading, reformatting if necessary, and storage in the disc memory 216 of all groups of desired link position and ON/OFF switch condition signals output from the recorder 201, the work robot drive phase is initiated, as shown in the flow charts of FIGS. 4c and 4d. Specifically, the groups of desired link position and ON/OFF switch condition signals are read from the disc memory 216 in step 306 and transferred to the microprocessor 210 via line 220 in step 307 where they are buffer stored in the microprocessor RAM. The groups of desired link position and ON/OFF switch condition signals are then transferred via microprocessor output line 223, communication interface 222, and robot controller input line 202, to the RAM of the robot controller 200 in step 308. The robot controller then executes its work robot program in step 309 to position the work robot links and ON/OFF switch in accordance with the desired link positions and ON/OFF switch signals stored in the robot controller RAM. The details of the robot controller work robot program execution step for each of the desired link position and ON/OFF switch condition signals now stored in its RAM are depicted in the flow chart of FIG. 4d to be discussed hereafter. After the robot controller 200 has executed its work robot program for all groups of desired work robot link position and ON/OFF switch condition signals, the robot controller transfers in step 310 the actual positions of the various work robot links stored in its RAM to the microprocessor RAM via line 209, communication interface 222, and line 211. The actual work robot link position signals stored in the RAM of microprocessor 210 in step 310 are then input via line 218 to the disc memory 216 in step 311 for storage therein.

The foregoing series of steps constituting the work robot drive phase are depicted in the flow chart of FIG. 4c. The steps shown in the flow chart of FIG. 4c, constituting the robot controller program, are sequentially repeated for each group of desired link position and ON/OFF switch condition signals until all groups are executed.

The robot controller program execution step 309 discussed in connection with the flow chart of FIG. 4c, is, as noted, detailed in the flow chart of FIG. 4d. The work robot program execution step shown in the flow chart of FIG. 4d is executed once for each group of desired work robot link position and ON/OFF switch condition sequels. Considering only one group of desired work robot link positions, the robot controller program execution step is now described. Specifically, the desired work robot link position for the first link of the group is retrieved in step 312 from the robot controller RAM. The actual position of the work robot link in question is input via its respective line 204 to the robot controller RAM in step 313. The desired and actual work robot link positions are then compared and a work robot link position error for that particular link is computed by the robot controller in step 314. The work robot link position error signal is output via its respective line 206 to its respective work robot link actuator in step 315 to position the work robot link. The actual position of the work robot link provided by the work robot link transducer on its respective line 204 is stored in the robot controller RAM in step 316.

The foregoing steps are repeated in step 317 for each desired work robot link position signal of a group, there being as many desired work robot link position signals in a group as there are work robot links. When all desired work robot link position signals in the group have been processed in the manner indicated, the desired ON/OFF switch condition signal of the group is retrieved in step 318 from the robot controller RAM and transferred in step 319 to the ON/OFF switch 58d of the work robot via line 208, completing the execution of the robot controller program for a single group of desired work robot link position and ON/OFF switch signals. The steps 312-319 of the flow chart shown in FIG. 4d are repeated for each group of desired work robot link position and ON/OFF switch condition signals until all groups of desired work robot link position and ON/OFF switch condition signals have been input to the work robot to drive it through the desired sequence of motions, which were programmed with the simulator robot at the workpiece site and stored in recorder 201, to the extent permitted by the mechanical response characteristics of the work robot.

Figure 4E:
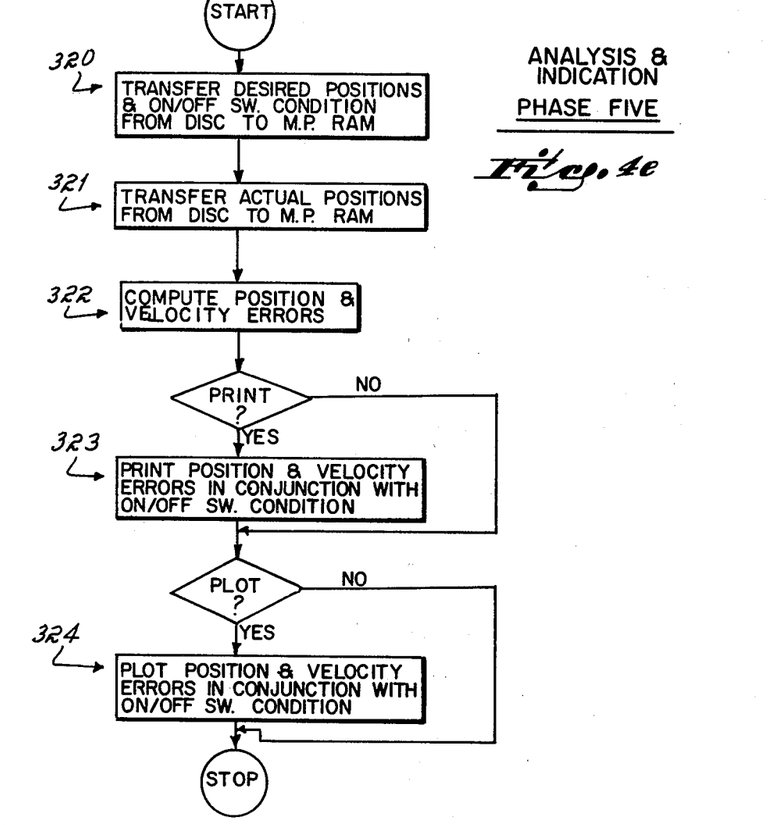

When all groups of the desired work robot link position and ON/OFF switch condition signals have been processed by the robot controller 200 and input to the work robot, the analysis phase depicted in the flow chart of FIG. 4e is initiated. Specifically, the actual positions of the work robot links for a group of desired positions are transferred in step 320 from disc memory 216 to the RAM of the microprocessor 210 via line 220. The desired work robot link position signals and ON/OFF switch condition signal for the corresponding group are transferred in step 321 from the disc memory 216 to the RAM of the microprocessor 210 via line 220. The microprocessor 210 compares, for each link, the actual and desired work robot link position signals, and in step 322 computes for each link the positional difference which exists. For any given desired position for any given work robot link, the computed positional difference represents the extent to which that work robot link failed to be positioned in response to the desired position command generated at the workpiece site by the simulator robot and stored in recorder 201.

Figure 5:
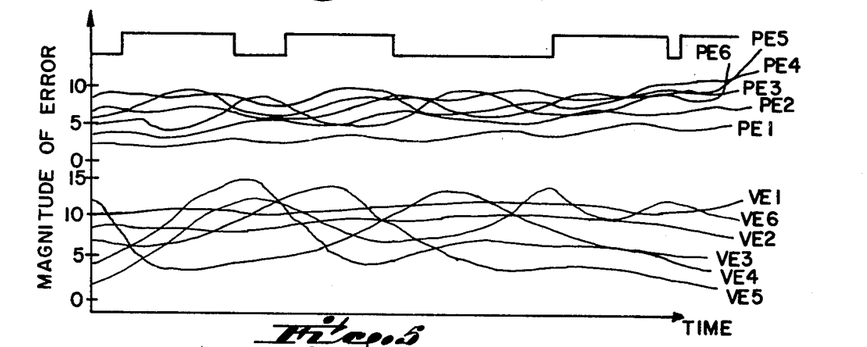
FIG. 5 is a typical graphical plot of work robot link velocity and positional errors corrdinated with the desired condition of the ON/OFF work robot output device switch.

Additionally, in step 322 the microcomputer 210 derives for each actual and desired work robot link position signal in a group, actual and desired velocity signals for the links of the work robot. These derived actual work robot link velocities and desired work robot link velocities are then compared and the differences therebetween computed. Any discrepancy between an actual and desired velocity for a link of the work robot is represented by a velocity error signal for that link. The position and velocity errors and desired ON/OFF switch condition for each link of the work robot for a group of desired link position signals generated at the workpiece site by the simulator robot and stored in recorder 201 are output via line 214 to the indicator 212 which may take the form of a printer (step 323) and/or plotter (step 324). With reference to FIG. 5, and assuming there are six links in the robot, for each group of desired work robot link positions, the indicator 212 provides, in addition to an indication SW corresponding to the desired ON/OFF switch condition, six separate indications PE1-PE6 of work robot link position errors (one per link) and six separate indications VE1-VE6 of work robot link velocity errors (one per link).

The foregoing steps of the analysis and indication phase for each group of desired and actual work robot link position and desired ON/OFF switch condition sequels which are depicted in the flow chart of FIG. 4e, are successively repeated until all groups of desired and actual link position and ON/OFF switch condition signals have been processed and indications of the resulting positional and velocity errors and ON/OFF switch conditions provided by indicator 212.

With the numerical printout and/or graphical plot of the discrepancies between the desired and actual work robot link positions and velocities, as well as an indication in the printout and/or plot of the desired condition of the ON/OFF switch, the feasibility of the work robot to perform a desired sequence of motions with respect to a particular workpiece located remote from the work robot can readily be evaluated. Obviously, if the discrepancies in position and velocity are negligible or nonexistent, it is clear that the work robot can perform the desired sequence of motions with respect to the workpiece and a work robot can be installed at the site of the workpiece with confidence it will be capable of performing the desired sequence of motions on the workpiece. If there are discrepancies between the actual and desired positions and/or velocities of the links of the work robot, these discrepancies can be evaluated taking into account such factors as the location on the workpiece where the discrepancy occurs, etc. If the discrepancy occurs on the workpiece in an area which is unimportant, such as a portion of the workpiece which will be covered by a molding or the like and hence not seen, the discrepancy probably can be ignored. Similarly, the discrepancy in position and/or velocity can be evaluated in light of the nature of the workpiece and the work being performed. For example, a major positional and/or velocity discrepancy in undercoating the undercarriage of an automobile or truck can be more readily ignored than can even a minor positional error in placing a decorative pinstripe on the outside of an automobile body or a velocity discrepancy in applying a reflective silver coating in the manufacture of a mirror.

While the invention has been described in connection with determining feasibility by analyzing positional and/or velocity differences between desired and actual positions and/or velocities for the individual links of the work robot, if desired the microprocessor 210 could compute positional and/or velocity discrepancies for the utilization device moved by the output link 22 of the work robot, such as the spray gun 58, which in reality is a vector consisting of position and direction in space. Were this approach used, the indicator 212 would provide a plot and/or numerical printout of the difference between the actual and desired vector of the robot output link, that is, the difference between the desired and actual position and direction in space of the spray gun or other utilization device being moved through the programmed sequence of motions by the work robot.

Additionally, and as an adjunct to the analysis provided by this invention, the recorded position signals in recorder 201 generated by the simulator robot at the site of the workpiece can be preliminarily analyzed at the site of the work robot to determine whether the desired work robot link velocities exceed the velocity limits of the work robot actuators. If the desired sequence of motions for the work robot links is such that the velocity limits of the work robot link actuators are exceeded, it is probably unnecessary to drive the work robot with the programmed sequence of desired motions generated by the simulator robot at the workpiece site which are stored in the recorder, since the errors between the desired and actual positions and velocities of the work robot links will no doubt result in a determination that the work robot cannot satisfactorily perform the desired sequence of motions with respect to the workpiece.

We claim:

1. Automation feasibility analyzing apparatus for analyzing the feasibility of performing a sequence of motions with a work robot, comprising:
    a work robot at a first location having a plurality of power-driven, signal-controlled links interconnected to permit relative motion therebetween to define plural degrees of freedom, at least some of said links being relatively massive, said work robot having a given mechanical response characteristic for positioning said links in response to position signals input to each link at a rate of N signals per link per second;
    a plurality of work robot link position transducers, a different work robot link position transducer being associated with each of said work robot links for generating an actual position signal representative of the actual position of the associated work robot link;
    a portable, relatively lightweight, manually manipulable simulator robot at a second location remote from said first location, said simulator robot having a plurality of interconnected links adapted the manual movement in different degrees of freedom for setting a program of desired mechanical responses, said links and degrees of freedom of said simulator robot simulating those of said work robot;
    a plurality of simulator robot link position transducers, a different simulator robot link position transducer being associated with each of said simulator robot links for generating a signal representative of the position of its associated simulator robot link;
    signal recording means at said second location responsive to said simulator robot link position transducers for storing the signals generated thereby representative of a program of desired mechanical responses;
    work robot control means at said first location responsive to said stored position signals generated by said plurality of simulator robot link position transducers for manipulating the work robot links for performing movements corresponding to the program of desired mechanical responses limited only by said given mechanical response characteristic of said work robot;
    analyzer means responsive to (a) said actual position signals generated by said plurality of work robot link position transducers when said work robot control means is input with stored position signals and (b) said stored position signals generated by said simulator robot transducers, for generating error signals correlated to the extent to which said work robot is capable of performing the program of desired mechanical responses manually imparted to said simulator robot; and
    indicating means responsive to said error signals for providing a humanly perceptible indication of the feasibility of said work robot for performing the program of desired mechanical responses imparted to said simulator robot.

2. The apparatus of claim 1 wherein said analyzer means generates error signals correlated to the difference between the actual position of said work robot links and the desired position imparted to said simulator robot links as recorded on said recorder, and wherein said indicating means displays information correlated to said positional differences between said actual and desired work robot link positions.

3. The apparatus of claim 2 further including:
    a switch element associated with said simulator robot manually operable between OFF and ON conditions of a utilization device movable by said work robot;
    means to monitor the condition of said switch element and provide switch condition signals correlated to the condition thereof when said simulator robot is manipulated to different positions;
    said signal recording means storing said switch condition signals in conjunction with said simulator robot link position transducer output signals; and
    wherein said indicating means is responsive to said signal recording means for displaying the monitored condition of said switch element in association with said displayed information correlated to said positional difference between said actual and desired work robot positions, whereby the feasibility of said work robot for performing said program of desired mechanical responses is analyzed in dependence upon the condition of said switch element.

4. The apparatus of claim 2 wherein said analyzer means generates error signals correlated to the difference between the actual velocity of said work robot links and the desired velocity imparted to said simulator robot links, and wherein said indicating means displays information correlated to said velocity differences between said actual and desired work robot link velocities, said velocity difference information and positional difference information being displayed in association with each other.

5. The apparatus of claim 4 further including:
a switch element associated with said simulator robot manually operable between OFF and ON conditions of a utilization device movable by said work robot;
means to monitor the condition of said switch element and provide switch condition signals correlated to the condition thereof when said simulator robot is manipulated to different positions;
said signal recording means storing said switch condition signals in conjunction with said simulator robot link position transducer output signals; and
wherein said indicating means is responsive to said signal recording means for displaying said switch condition in association with said displayed information correlated to said positional and velocity differences.

6. The apparatus of claim 1 wherein said analyzer means generates error signals correlated to the difference between the actual velocity of said work robot links and the desired velocity imparted to said simulator robot links, and wherein said indicating means displays information correlated to said velocity differences between said actual and desired work robot link velocities.

7. The apparatus of claim 1 wherein said stored position signals are input to said recorder at a rate of at least N signals per link per second, and said actual position signals are generated at a rate of N signals per link per second, and said work robot control means is input with said stored position signals at a rate of N/M signals per link per second, where N,M is greater than 1, said work robot control means including an interpolator for providing interpolated position signals between said stored position signals input to said control means for controlling said work robot with a combination of stored and interpolated position signals.

8. A method of analyzing at a first location the feasibility of performing a sequence of motions with a work robot having a given mechanical response characteristic located at a second location remote from first location, which work robot has a plurality of different, power-driven, signal-controlled links interconnected to permit relative motion therebetween to define plural degrees of freedom, at least some of said links being relatively massive, said method comprising the steps of:
manually manipulating at the second location a portable, relatively lightweight, simulator robot having links and degrees of freedom simulating those of the work robot, for setting a program of desired mechanical responses;
generating plural signals per link per second with position transducers associated with the simulator robot links representative of the position of the simulator robot links during setting of the program of desired mechanical responses;
storing in a recorder the position signals generated during manipulation of the simulator robot to thereby store the program of desired mechanical responses;
driving the work robot at the second location with the recorded position signals for performing work robot link movements corresponding to the program of desired mechanical responses limited only by the mechanical response characteristics of the work robot;
generating from position transducers associated with the work robot links actual position signals representative of the actual position of the work robot links while driving the work robot with the recorded position signals representative of the program of desired mechanical responses;
deriving from said actual position signals and said recorded simulator robot position signals, error signals correlated to the extent to which the work robot is capable of performing the program of desired mechanical responses manually imparted to the simulator robot; and
deriving, in response to the error signals, a humanly perceptible indication of the feasibility of the work robot for performing the program of desired mechanical responses imparted to the simulator robot.

9. The method of claim 8 wherein:
said error derivation step includes generating error signals correlated to the difference between the actual position of the work robot links and the desired position imparted to the simulator robot links as recorded in the recorder; and
said indicating step includes displaying information correlated to the positional differences between the actual and desired work robot link positions.

10. The method of claim 9 further including the steps of:
monitoring and storing in conjunction with the simulator robot position signals the condition of a switch element associated with the simulator robot, which switch element is operable between OFF and ON conditions of a utilization device movable by the work robot, when the simulator robot is manipulated to different positions; and
displaying the condition of the switch element in association with the displayed positional differences of the simulator and work robot links, to facilitate analysis of the feasibility of the work robot for performing the program of desired mechanical responses in dependence upon the condition of the switch element.

11. The method of claim 10 wherein:
said error derivation step includes generating signals correlated to the difference between the actual velocity of the work robot links and the desired velocity imparted to the simulator robot links; and
said indicating step includes displaying information correlated to the velocity differences between the actual and desired work robot link velocities in association with the positional differences between desired and actual work robot link velocities.

12. The method of claim 9 wherein:
said error derivation step includes generating signals correlated to the difference between the actual velocity of the work robot links and the desired velocity imparted to the simulator robot links; and
said indicating step includes displaying information correlated to the velocity differences between the actual and desired work robot link velocities in association with the positional differences between desired and actual work robot link velocities.

13. The method of claim 8 further including the steps of:
monitoring and storing in conjunction with the simulator robot position signals the condition of a switch element associated with the simulator robot, which switch element is operable between OFF and ON conditions of a utilization device movable by the work robot, when the simulator robot is manipulated to different positions;

said error derivation step includes generating signals correlated to the difference between the actual velocity of the work robot links and the desired velocity imparted to the simulator robot links;

displaying information correlated to the velocity differences between the actual and desired work robot link velocities; and displaying the condition of the switch element in association with the displayed information correlated to said velocity differences.

14. The method of claim 8 wherein said driving step includes utilizing N/M stored position signals per link per second, where N,M is greater than 1, and generating interpolated position signals between said stored position signals for controlling said work robot with a combination of stored and interpolated position signals.

* * * * *

UNITED STATES PATENT AND TRADEMARK OFFICE
CERTIFICATE OF CORRECTION

PATENT NO. : 4,360,886
DATED : November 23, 1982
INVENTOR(S) : Evans Kostas et al It is certified that error appears in the above-identified patent and that said Letters Patent are hereby corrected as shown below:

In the Abstract:

Col. 1, Line 1, after "method", insert -- is disclosed --.

Col. 2, Line 20, after "is", insert -- also --.

In the Specification:

Col. 4, Line 61, "corrdinated" should be -- coordinated --.

In the Claims:

Col. 17, Line 62, after "adapted", delete "the" and insert "for".

Col. 19, Line 33, N/M should be $\frac{N}{M}$ .

Col. 19, Line 67, "characteristics" should be --characteristic--.

Col. 22, Line 5, N/M should be $\frac{N}{M}$ .

Signed and Sealed this

Thirty-first Day of May 1983

[SEAL]

Attest:

DONALD J. QUIGG

Attesting Officer     Acting Commissioner of Patents and Trademarks